United States Patent
Nielsen et al.

(10) Patent No.: US 12,418,315 B2
(45) Date of Patent: Sep. 16, 2025

(54) MULTIPLE ANTENNA ARRANGEMENTS

(71) Applicant: NOKIA TECHNOLOGIES OY, Espoo (FI)

(72) Inventors: Kim Nielsen, Storvorde (DK); Faranaz Sabouri-Sichani, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 434 days.

(21) Appl. No.: 18/154,395

(22) Filed: Jan. 13, 2023

(65) Prior Publication Data
US 2023/0223967 A1 Jul. 13, 2023

(30) Foreign Application Priority Data
Jan. 13, 2022 (EP) .................................. 22151338

(51) Int. Cl.
*H04B 1/00* (2006.01)
*H01Q 5/307* (2015.01)
(Continued)

(52) U.S. Cl.
CPC ........... *H04B 1/0064* (2013.01); *H01Q 5/307* (2015.01); *H01Q 21/30* (2013.01)

(58) Field of Classification Search
None
See application file for complete search history.

(56) References Cited

U.S. PATENT DOCUMENTS 6,360,089 B1 * 3/2002 Saitoh .................. H04B 7/0802
455/343.1
6,757,267 B1 * 6/2004 Evans .................. H04B 7/0615
343/834

(Continued)

FOREIGN PATENT DOCUMENTS

| CN | 112787080 A | 5/2021 |
|---|---|---|
| WO | WO 2013/062914 A1 | 5/2013 |

(Continued)

OTHER PUBLICATIONS

"3rd Generation Partnership Project; Technical Specification Group Radio Access Network; NR; Radio Resource Control (RRC) Protocol Specification (Release 16)", 3GPP TS 38.331 v16.7.0, (Dec. 2021), 963 pages.

(Continued)

*Primary Examiner* — Tuan A Tran
(74) *Attorney, Agent, or Firm* — ALSTON & BIRD LLP (57) ABSTRACT

An apparatus comprising includes first and second radio frequency circuitry configured for operation at least in one or more first and second radio frequency bands, respectively; and first and second antenna arrangements configured for operation in the one or more first and second radio frequency bands, respectively. The apparatus also includes first and second radio frequency coupling for transferring of a signal between the first and second antenna arrangements, respectively, and the first and second radio frequency circuitry, respectively. The apparatus further includes a controller for assessing whether a signal can be transferred between the second antenna arrangement and the first radio frequency circuitry and, in dependence upon the assessment, for transferring the signal therebetween, via a frequency converter configured to enable, for the signal, frequency conversion between the one or more second radio frequency bands and the one or more first radio frequency bands.

20 Claims, 3 Drawing Sheets (51) Int. Cl.
*H01Q 21/30* (2006.01)
*H04B 1/06* (2006.01)
*H04B 1/38* (2015.01)
*H04B 7/00* (2006.01)

(56) References Cited

U.S. PATENT DOCUMENTS

| | | | | |
|---|---|---|---|---|
| 6,826,391 | B2* | 11/2004 | Leinonen | H04B 7/12 |
| | | | | 455/193.1 |
| 7,702,051 | B2* | 4/2010 | Lindenmeier | H04B 7/0874 |
| | | | | 375/347 |
| 8,369,811 | B2* | 2/2013 | Sultenfuss | H04B 1/40 |
| | | | | 455/272 |
| 8,565,701 | B2* | 10/2013 | Sanchez | H04B 1/006 |
| | | | | 455/168.1 |
| 8,654,743 | B1* | 2/2014 | Li | H01Q 3/24 |
| | | | | 370/278 |
| 8,682,274 | B2* | 3/2014 | Sultenfuss | H01Q 21/28 |
| | | | | 455/272 |
| 8,989,677 | B2* | 3/2015 | Leinonen | H04B 1/0064 |
| | | | | 455/562.1 |
| 9,967,003 | B2* | 5/2018 | Zavadsky | H04W 88/085 |
| 10,128,895 | B2* | 11/2018 | Liao | H04B 1/44 |
| 10,284,235 | B2* | 5/2019 | Thompson | H04B 1/006 |
| 10,374,665 | B2* | 8/2019 | Zavadsky | H04B 7/04 |
| 10,447,458 | B2* | 10/2019 | Chang | H04L 5/001 |
| 10,484,075 | B1* | 11/2019 | Maheshwari | H04W 24/02 |
| 10,498,521 | B2* | 12/2019 | Little | H04B 1/48 |
| 10,631,283 | B2 | 4/2020 | Marinier et al. | |
| 10,673,484 | B2* | 6/2020 | See | H04B 1/0067 |
| 11,019,542 | B1 | 5/2021 | Tong et al. | |
| 11,405,059 | B2* | 8/2022 | Pehlke | H04B 1/18 |
| 11,664,963 | B2* | 5/2023 | Chang | H04L 5/1469 |
| | | | | 370/280 |
| 11,716,100 | B2* | 8/2023 | Pehlke | H04B 1/0078 |
| | | | | 375/262 |
| 11,799,502 | B2* | 10/2023 | Pehlke | H04B 1/006 |
| 12,132,509 | B2* | 10/2024 | Loh | H04B 1/0064 |
| 12,166,510 | B2* | 12/2024 | Pehlke | H04B 1/0458 |

| | | | | |
|---|---|---|---|---|
| 2019/0166066 | A1 | 5/2019 | Ang et al. | |
| 2019/0357264 | A1 | 11/2019 | Yi et al. | |
| 2020/0091608 | A1 | 3/2020 | Alpman et al. | |
| 2020/0235762 | A1* | 7/2020 | Cardona, Jr. | H04B 7/0831 |
| 2021/0120429 | A1 | 4/2021 | Liu et al. | |
| 2021/0391889 | A1 | 12/2021 | Kwon et al. | |
| 2022/0337274 | A1 | 10/2022 | Nielsen | |

FOREIGN PATENT DOCUMENTS

| | | |
|---|---|---|
| WO | WO 2021/002866 A1 | 1/2021 |
| WO | WO 2021/142782 A | 7/2021 |

OTHER PUBLICATIONS

"3rd Generation Partnership Project; Technical Specification Group Radio Access Network; NR; Requirements for support of radio resource management (Release 17)", 3GPP TS 38.133 v17.3.0, (Sep. 2021), 3207 pages.

"3rd Generation Partnership Project; Technical Specification Group Radio Access Network; NR; User Equipment (UE) procedures in Idle mode and RRC Inactive state (Release 16)", 3GPP TS 38.304 v16.7.0, (Dec. 2021), 39 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1 v17.3.0, (Sep. 2021), 580 pages.

"3rd Generation Partnership Project; Technical Specification Group Services and System Aspects; Procedures for the 5G System (5GS); Stage 2 (Release 17)", 3GPP TS 23.502 v17.3.0, (Dec. 2021), 727 pages.

"3rd Generation Partnership Project; Technical Specification Group Services and System Aspects; System architecture for the 5G System (5GS); Stage 2 (Release 17)", 3GPP TS 23.501 v17.3.0, (Dec. 2021), 559 pages.

Cabric et al., "Spectrum Sharing Radios", IEEE Circuits and Systems Magazine, vol. 6, Issue 2, (2006), 16 pages.

Extended European Search Report for European Application No. 22151338.5 dated Jul. 6, 2022, 15 pages.

* cited by examiner

MULTIPLE ANTENNA ARRANGEMENTS

CROSS-REFERENCE TO RELATED APPLICATIONS

This application claims priority to European Patent Application No. 22151338.5, filed Jan. 13, 2022, the entire contents of which are incorporated herein by reference.

TECHNOLOGICAL FIELD

Embodiments of the present disclosure relate to apparatus that use multiple antenna arrangements.

BACKGROUND

Antenna arrangements, whether individual antennas or antenna arrays, are configured for operation in specific operational frequency bands.

Specific radio frequency receiver and/or transmitter circuitry is often configured to operate with specific antenna arrangements.

Radio frequency circuitry has associated manufacturing costs and also associated energy consumption.

An apparatus such as a radio telecommunications terminal can operate in multiple radio frequency bands. It can for example comprise: first radio frequency circuitry configured for operation at least in one or more first radio frequency bands, a first antenna arrangement configured for operation in the one or more first radio frequency bands, and means for transferring of a signal between the first antenna arrangement and the first radio frequency circuitry. It can also comprise second radio frequency circuitry configured for operation at least in one or more second radio frequency bands (different to the first radio frequency bands), a second antenna arrangement configured for operation in the one or more second radio frequency bands, and means for transferring of a signal between the second antenna arrangement and the second radio frequency circuitry.

BRIEF SUMMARY

According to various, but not necessarily all, embodiments there is provided an apparatus comprising:
first radio frequency circuitry configured for operation at least in one or more first radio frequency bands;
second radio frequency circuitry configured for operation at least in one or more second radio frequency bands;
a first antenna arrangement configured for operation in the one or more first radio frequency bands;
a second antenna arrangement configured for operation in the one or more second radio frequency bands;
means for transferring of a signal between the second antenna arrangement and the second radio frequency circuitry;
means for transferring of a signal between the first antenna arrangement and the first radio frequency circuitry;
control means for assessing whether a signal can be transferred between the second antenna arrangement and the first radio frequency circuitry and, in dependence upon the assessment, for transferring the signal between the second antenna arrangement and the first radio frequency circuitry, via a frequency converter configured to enable, for the signal, frequency conversion between the one or more second radio frequency bands and the one or more first radio frequency bands.

In some but not necessarily all examples, the apparatus is configured to assess whether the signal can be transferred between the second antenna arrangement and the first radio frequency circuitry in dependence upon a bandwidth of the signal and/or a sub carrier spacing of the signal.

In some but not necessarily all examples, the apparatus is configured to assess that the signal can be transferred between the second antenna arrangement and the first radio frequency circuitry only when a required bandwidth of the signal does not exceed 100 MHz and a required sub carrier spacing of the signal does not exceed 60 kHz.

In some but not necessarily all examples, the apparatus is configured to assess whether the signal can be transferred between the second antenna arrangement and the first radio frequency circuitry in dependence upon an availability of the first radio frequency circuitry for the signal.

In some but not necessarily all examples, the apparatus is configured as user equipment.

In some but not necessarily all examples, the apparatus is configured to transfer control channel signals between the second antenna arrangement and the first radio frequency circuitry, via the frequency converter.

In some but not necessarily all examples, the apparatus is configured to transfer signals for an initial access procedure between the second antenna arrangement and the first radio frequency circuitry, via the frequency converter or configured to transfer signals during the Radio Resource Control Idle state between the second antenna arrangement and the first radio frequency circuitry, via the frequency converter.

In some but not necessarily all examples, the apparatus is configured to cause transfer of signals for: paging, or measurement for cell or beam selection, or for user equipment to network notification, between the second antenna arrangement and the first radio frequency circuitry, via the frequency converter.

In some but not necessarily all examples, the apparatus is configured to switch an assessment that a data communications signal can be transferred between the second antenna arrangement and the first radio frequency circuitry to an assessment that the data communications signal cannot be transferred between the second antenna arrangement and the first radio frequency circuitry, and configured to switch within or between time periods, in dependence upon the assessment, from transferring the signal between the second antenna arrangement and the first radio frequency circuitry, via the frequency converter to transferring the signal between the second antenna arrangement and the second radio frequency circuitry.

In some but not necessarily all examples, the apparatus is configured to transfer signals for clear channel assessment between the second antenna arrangement and the first radio frequency circuitry, via the frequency converter.

In some but not necessarily all examples, the apparatus is configured to assess whether a signal can be transferred between the second antenna arrangement and the first radio frequency circuitry in dependence upon: a battery level of the apparatus; or generated heat at the apparatus.

In some but not necessarily all examples, the apparatus is configured to control at least a bandwidth of a signal required for a service such that it can be transferred between the second antenna arrangement and the first radio frequency circuitry, via the frequency converter.

In some but not necessarily all examples, the apparatus is configured to cause transfer of multiple signals between the second antenna arrangement and the first radio frequency circuitry to augment receiver channels available via the second radio frequency circuitry.

In some but not necessarily all examples, the apparatus is configured to move the second radio frequency circuitry to a low-power consumption mode while transferring the signal between the second antenna arrangement and the first radio frequency circuitry, via a frequency converter.

According to various, but not necessarily all, embodiments there is provided a method comprising:
assessing whether a signal can be transferred between a first radio frequency circuitry, configured for operation in one or more first radio frequency bands and a second antenna arrangement, configured for operation in one or more second radio frequency bands that are different to the one or more first radio frequency bands; and, in dependence upon the assessment
(i) transferring the signal between a second radio frequency circuitry configured for operation in one or more second radio frequency bands and the second antenna arrangement; or
(iii) transferring the signal between the first radio frequency circuitry and the second antenna arrangement, via a frequency converter configured to enable, for the signal, frequency conversion between the one or more second radio frequency bands and the one or more first radio frequency bands.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
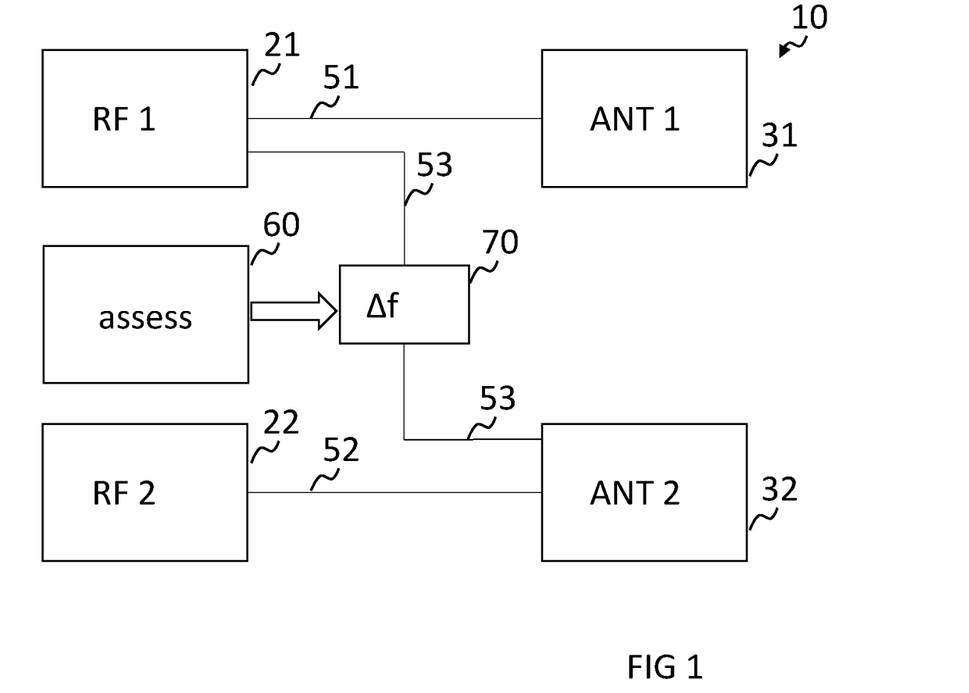
FIG. 1 shows an example of the subject matter described herein.

FIG. 1 illustrates an example of an apparatus 10 that performs radio communication in multiple radio frequency bands. The apparatus 10 can be a receiver, a transmitter or a transceiver.

The apparatus can be a network component or a terminal. In at least some but not necessarily all examples the apparatus 10 is user equipment for a third-generation partnership project (3GPP) network.

Figure 2:
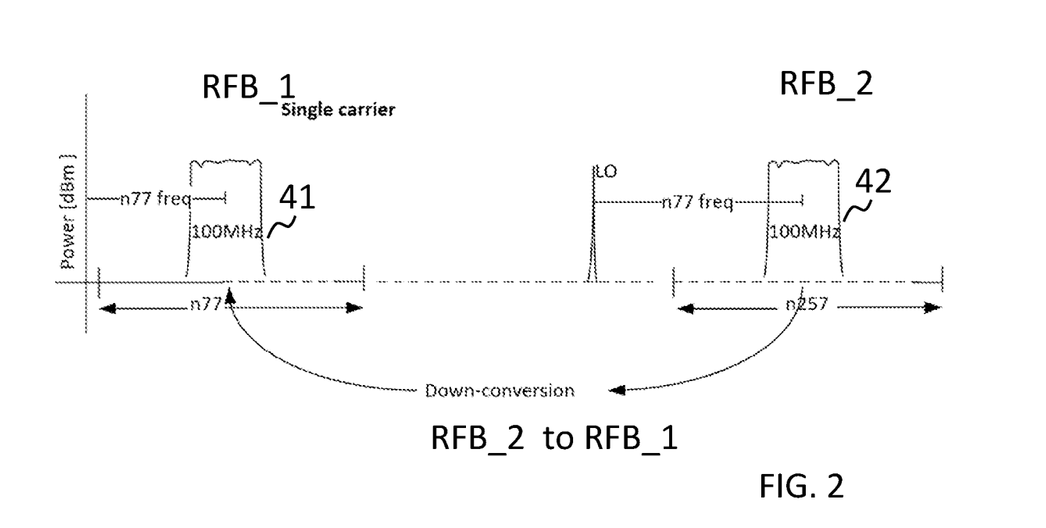
FIG. 2 shows another example of the subject matter described herein.

FIG. 2 illustrates examples of one or more first radio frequency bands 41 and one or more second radio frequency bands 42. In some but not necessarily all examples, the one or more second radio frequency bands 42 are at a higher frequency than the one or more first radio frequency bands 41.

Referring back to FIG. 1, the apparatus 10 comprises: first radio frequency circuitry 21 configured for operation at least in one or more first radio frequency bands 41; a first antenna arrangement 31 configured for operation in the one or more first radio frequency bands 41; and means 51 for transferring of a signal between the first antenna arrangement 31 and the first radio frequency circuitry 21.

The apparatus 10 additionally comprises: second radio frequency circuitry 22 configured for operation at least in one or more second radio frequency bands 42;
a second antenna arrangement 32 configured for operation in the one or more second radio frequency bands 42; and means 52 for transferring of a signal between the second antenna arrangement 32 and the second radio frequency circuitry 22.

In addition, the apparatus 10 comprises control means 60 for assessing whether a signal can be transferred between the second antenna arrangement 32 and the first radio frequency circuitry 21 and, in dependence upon the assessment, for transferring the signal between the second antenna arrangement 32 and the first radio frequency circuitry 21, via a frequency converter 70.

The frequency converter 70 is configured to enable, for the signal, frequency conversion between one or more second radio frequency bands 42 and one or more first radio frequency bands 41.

The means 51 for transferring of a signal between the first antenna arrangement 31 and the first radio frequency circuitry 21 can be a first radio frequency coupling, for example, a first radio frequency path.

The means 52 for transferring of a signal between the second antenna arrangement 32 and the second radio frequency circuitry 22 can be a second radio frequency coupling, for example, a second radio frequency path.

Means 53 transfers the signal between the second antenna arrangement 32 and the first radio frequency circuitry 21, via a frequency converter 70. The means 53 for transferring of a signal between the second antenna arrangement 32 and the first radio frequency circuitry 21 can be a third radio frequency coupling, for example, a third radio frequency path.

The control means 60 for assessing whether a signal can be transferred between the second antenna arrangement 32 and the first radio frequency circuitry 21 and, in dependence upon the assessment, for causing transfer of the signal between the second antenna arrangement 32 and the first radio frequency circuitry 21, via a frequency converter 70, can be a controller or other similar control circuitry.

There can thus be a sharing/re-use of components used for the first radio frequency bands 41 and for the second radio frequency bands 42. While the first antenna arrangement 31 for the first radio frequency band(s) 41 is different (and often physically distinct) from the second antenna arrangement 32 for the second radio frequency band(s) 42, there can be sharing/re-use of the first radio frequency circuitry 21.

An antenna arrangement can be an antenna or a group of antennas. The group of antennas can be a panel or array of antennas. An antenna, in contrast to a group of antennas, can be a single antenna, for example and not limited to at least one of: a monopole antenna, a dipole antenna, a loop antenna, a patch antenna, a planar-inverted-F antenna (PIFA), an inverted-F antenna (IFA), a planar inverted-L antenna (PILA), a folded monopole or dipole antenna, a helical or helix antenna, and so on.

Some of the antenna arrangements can have spatial diversity. This can arise from different directionality capability of antenna arrangements and/or this can arise from different physical positions or locations of antenna arrangements.

Some antenna arrangements can have polarization diversity. This can arise from different polarization capability of antenna arrangements.

The first antenna arrangement 31 is configured for operation in the one or more first radio frequency bands 41. A first signal in the one or more first radio frequency bands 41 can be received (or transmitted) via the first antenna arrangement 31.

The second antenna arrangement 32 is configured for operation in one or more second radio frequency bands 42. A second signal in the one or more second radio frequency bands 42 can be received (or transmitted) via the second antenna arrangement 32.

The first signal in the one or more first radio frequency bands 41 cannot be efficiently received (or transmitted) via the second antenna arrangement 32. The second signal in the one or more second radio frequency bands 42 cannot be efficiently received (or transmitted) via the first antenna arrangement 31.

The frequency converter 70 can be a frequency down-converter and/or a frequency up-converter.

In at least some examples, the frequency converter 70 is configured to down-convert a frequency of a second signal received via the second antenna arrangement 32, in one or more second radio frequency bands 42, to the one or more first radio frequency bands 41.

In at least some examples, the frequency converter 70 is configured to up-convert a frequency of a first signal for transmission via the second antenna arrangement 32 from one or more first radio frequency bands 41 to the one or more second radio frequency bands 42.

In some but not necessarily all examples, a single shared radio frequency path can be configured for transferring to the first radio frequency circuitry 21 both the second signal received via the second antenna arrangement 32 after down-conversion to the one or more first radio frequency bands 41 and the first signal received via the first antenna arrangement 31 in the one or more first radio frequency bands 41.

In some but not necessarily all examples, a single radio frequency path can be configured for transferring, from the first radio frequency circuitry 21, both the second signal for transmission via the second antenna arrangement 32 after up-conversion from the one or more first radio frequency bands 41 to the one or more second radio frequency bands 42 and the first signal for transmission via the first antenna arrangement 31 in the one or more first radio frequency bands 41.

In some examples, the apparatus 10 comprises a node at which the shared radio frequency path meets with the third radio frequency path 53 to the second antenna arrangement 32 via the frequency down-converter 70 and a first radio frequency path 51 to the first antenna arrangement 31 not via the frequency down-converter 70. The node can be implemented in various different forms. It can for example comprise a switch and/or a combiner.

A length of the shared radio frequency path between the node and the first radio frequency circuitry 21 can be relatively long. In some but not necessarily all examples, the shared radio frequency path is at least an order of magnitude greater than a length of that part of the third radio frequency path 53 between the frequency converter 70 and the second antenna arrangement 32. In some but not necessarily all examples, the length extends substantially from one side (e.g. a lengthwise end) of a user equipment to an opposing side of the user equipment (e.g. the other lengthwise end). The loss per mm (dB/mm) of a radio frequency path such as, for example a transmission line, typically increases with length and also as frequency increases. The frequency converter 70 can be placed adjacent the second antenna arrangement 32 so as to down-convert the frequency to one which has less loss/mm for reception. In some but not necessarily all examples, a low noise amplifier (LNA), which is typically one of the first blocks in a receiver chain connected to the antenna, is placed close to the antenna with the frequency converter 70 so that the RF receiver system provides the least impact on system noise due to Friis' formula (the overall noise figure is primarily influenced by the noise figure of the first amplifier stage, the LNA).

In some but not necessarily all examples, at least a portion of the shared radio frequency path is provided by a transmission line, for example, a coaxial cable. A transmission line which is suitable for the operational frequency band(s) can, for example, be: microstrip lines, striplines, co-planar waveguides (CPW), slotlines, coplanar strips, strip dielectric waveguide, microwave waveguides, etc.

In some but not necessarily all examples, the shared radio frequency path is configured to transfer radio frequency signals in the one or more first radio frequency bands 41 more effectively than radio frequency signals in the one or more second radio frequency bands 42.

In some but not necessarily all examples, at least a portion of the shared radio frequency path is provided by a micro high-frequency radio frequency cable, a flexible coaxial cable or an antenna flex cable ribbon, or similar efficient radio frequency transmission line.

In some but not necessarily all examples, the apparatus 10 is configured as mobile equipment or user equipment. The signals received can, for example, be downlink signals from a network or via sidelink signals from a relay, user equipment or another apparatus 10.

FIG. 2 illustrates an example of down-conversion of a frequency of a second signal received via the second antenna arrangement 32, in one or more second radio frequency bands 42, to the one or more first radio frequency bands 41.

In some examples, but not necessarily all examples, the first radio frequency circuitry 21 is configured for operation at least in the one or more first radio frequency bands 41 but not for operation in any of the second radio frequency bands 42.

In some examples, but not necessarily all examples, the second radio frequency circuitry 22 is configured for operation at least in the one or more second radio frequency bands 42 but not for operation in any of the first radio frequency bands 41.

The first radio frequency band(s) 41 occupy a first frequency range and the second radio frequency band(s) 42 occupy a second frequency range that does not overlap the first frequency range 41.

In this example, but not necessarily all examples, the one or more second radio frequency band(s) 42 comprise a n257 band defined by specification 3GPP TS 38.101-2. In this example, but not necessarily all examples, the one or more first radio frequency band(s) 41 comprise a n77 band defined by specification 3GPP TS 38.101-1.

In some examples but not necessarily all examples, the frequency converter 70 is programmable to convert between a frequency of a second signal received via the second antenna arrangement 32, in one of the second radio frequency band(s), and a selected first radio frequency band. The size of conversion is programmable.

The target of the conversion can therefore be varied. This can be used to target the conversion to an unused one or more first radio frequency bands 41.

For example, the selected first radio frequency band 41 is selected because it is an available radio frequency band at the first radio frequency circuitry 21.

Referring back to FIG. 1, the control means 60 assesses whether a signal can be transferred between the second antenna arrangement 32 and the first radio frequency circuitry 21 and, in dependence upon the assessment, causes transfer of the signal between the second antenna arrangement 32 and the first radio frequency circuitry 21, via the frequency converter 70.

The assessment of whether a signal can be transferred between the second antenna arrangement 32 and the first radio frequency circuitry 21 can be dependent upon a bandwidth (BW) of the signal and/or a sub carrier spacing of the signal. For example, a signal can be assessed as suitable to be transferred between the second antenna arrangement 32 and the first radio frequency circuitry 21 only when a required bandwidth of the signal does not exceed 100 MHz and a required sub carrier spacing (SCS) of the signal does not exceed 60 kHz.

The assessment of whether a signal can be transferred between the second antenna arrangement 32 and the first radio frequency circuitry 21 can alternatively or additionally be dependent upon an availability of the first radio frequency circuitry 21 for the signal.

Figure 3:
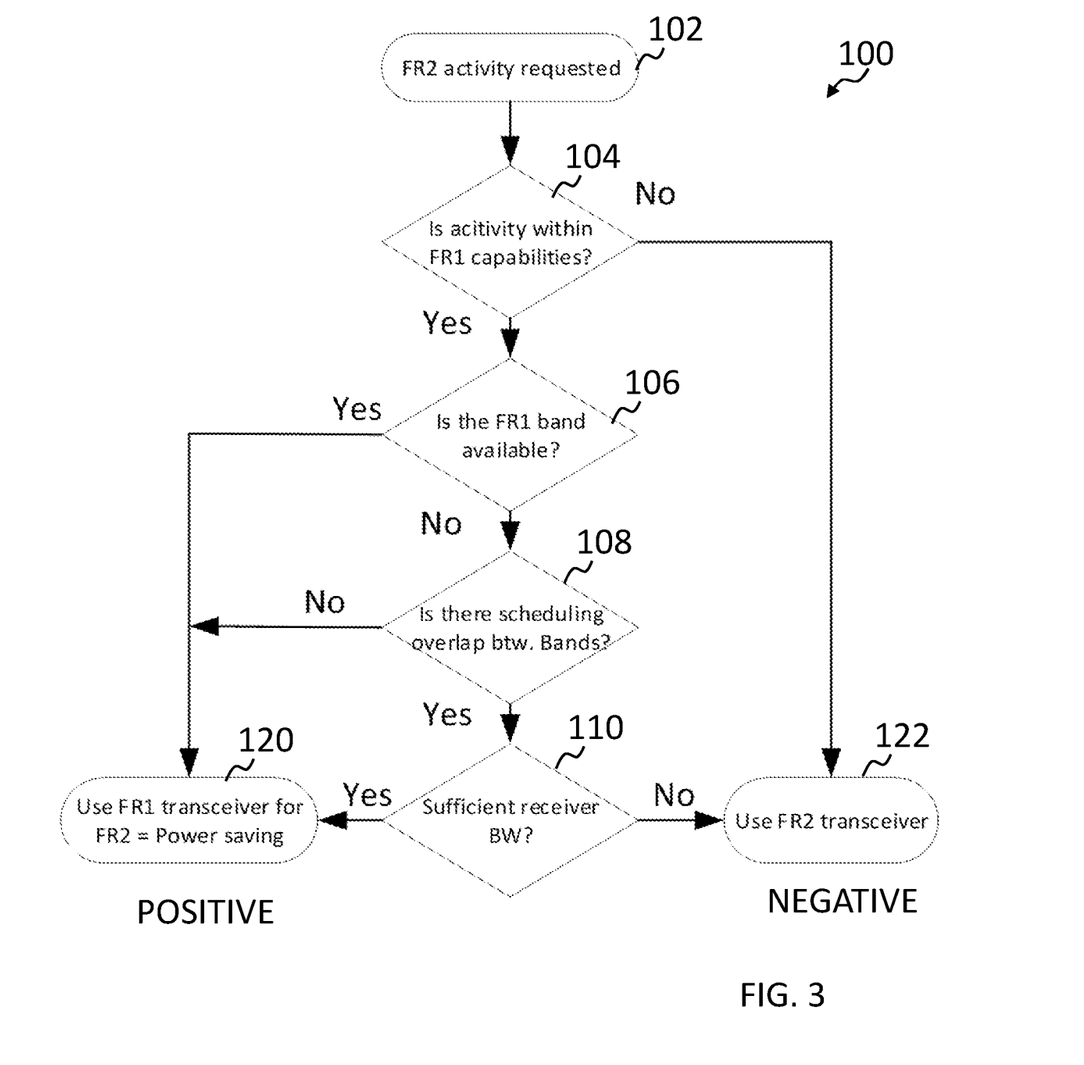
FIG. 3 shows another example of the subject matter described herein.

FIG. 3 illustrates an example of an assessment method 100. The method 100 assesses whether a signal can be transferred between the second antenna arrangement 32 and the first radio frequency circuitry 21. If a signal can be transferred between the second antenna arrangement 32 and the first radio frequency circuitry 21, the assessment is positive 120. If a signal cannot be transferred between the second antenna arrangement 32 and the first radio frequency circuitry 21, the assessment is negative 122.

If the assessment is positive 120, then there is transfer of the signal between the second antenna arrangement 32 and the first radio frequency circuitry 21, via the frequency converter 70. In some but not necessarily all examples, the second radio frequency circuitry 22 can be put in a low power consumption mode which saves power.

If the assessment is negative 122, then there is transfer of the signal between the second antenna arrangement 32 and the second radio frequency circuitry 22.

In this example, but not necessarily all examples, the one or more first radio frequency bands 41 are represented by FR1 (frequency range 1) and the one or more second radio frequency bands 42 are represented by FR2 (frequency range 2). FR1 and FR2 are frequency ranges defined by 3GPP. FR1 is in the range 0.410 to 7.125 GHz. FR2 is in the range above 24.250 GHz. FR1 has a maximum bandwidth per carrier of 100 Mhz and a maximum sub carrier spacing (SCS) of 60 kHz. FR2 has a minimum bandwidth per carrier of 50 Mhz and a maximum bandwidth per carrier of 400 Mhz and has a minimum SCS of 60 kHz and a maximum SCS of 240 kHz. The method 100 is performed by user equipment (UE) 10.

In the following any reference to FR1 as a frequency range can be replaced by a reference to the one or more first radio frequency bands 41 and any reference to FR2 as a frequency range can be replaced by a reference to the one or more second radio frequency bands 42.

In this example, the first radio frequency circuitry 21 is described as FR1 circuitry and the second radio frequency circuitry 22 is described as FR2 circuitry.

At block 102, the UE requests FR2 activity.

At block 104, the UE determines whether or not the requested activity is within the FR1 capabilities.

For example, there is a negative assessment 122 if a required bandwidth of the signal exceeds 100 MHz or a required sub carrier spacing of the signal exceeds 60 kHz.

The possibility of a positive assessment is retained, if a required bandwidth of the signal does not exceed 100 MHz and a required sub carrier spacing of the signal does not exceed 60 kHz; the method moves to block 106.

At block 106, the UE determines whether or not the FR1 circuitry is available, that is free to use. There is a positive assessment 120 if the FR1 circuitry is available, that is free to use.

The FR1 circuitry is not free to use if it has been reserved for use by the network or is in use.

If the FR1 circuitry is not freely available, then it can be assessed whether the FR1 circuitry is available through time division (block 108) or available through frequency sharing (block 110).

If, at block 106, the UE determines that the FR1 circuitry is not available, then the method moves to block 108.

At block 108, the UE determines if there is a scheduling overlap between bands. If not, there is a time at which the FR1 circuitry can be used and there is a positive assessment 120. Otherwise, the method moves to block 110.

At block 110, the UE determines if there is sufficient bandwidth, in this example receiver bandwidth. If so, even though there is temporal overlap there is sufficient bandwidth available within FR1 for use and there is a positive assessment 120. Otherwise, the method makes a negative assessment 122.

The method therefore allocates one or more unused bands within FR1 for the communication of FR2 signals (block 106) or shares bands used within FR1 for the communication of FR2 signals either in a time divided manner, without temporal overlap (block 108) or with temporal overlap and in a frequency shared manner sharing the available bandwidth (block 110).

The above-described examples have many applications.

In some but not necessarily all examples, the apparatus 10 is configured to transfer control channel signals between the second antenna arrangement 32 and the first radio frequency circuitry 21, via the frequency converter 70.

In some but not necessarily all examples, the apparatus 10 is configured to transfer signals for an initial access procedure between the second antenna arrangement 32 and the first radio frequency circuitry 21, via the frequency converter 70. For example, at initial registration the UE transmits its NAS (Non Access Stratum) message (Registration Request) to camp on an FR2 network node.

In some but not necessarily all examples, the apparatus 10 is configured to transfer signals during the Radio Resource Control (RRC) Idle state or Inactive state between the second antenna arrangement 32 and the first radio frequency circuitry 21, via the frequency converter 70.

A UE in RRC_IDLE or RRC_INACTIVE does not have any data traffic, but still needs to communicate with the network to perform for example: paging monitoring and reception (downlink DL), Radio Resource Management (RRM) measurements for cell (re)selection (downlink DL), send tracking area and RAN-based notification area updates to the network (uplink UL).

There is no need to apply high BW nor higher SCS due to relatively low payload in these procedures. Hence, the UE can continue utilizing its FR1 hardware (first radio frequency circuitry 21, via the frequency converter 70) after registration and moving to camped in IDLE mode in FR2. Similarly, when the UE is moved to RRC_INACTIVE after being in RRC_CONNECTED state it can reroute the signaling from FR2 to FR1 (first radio frequency circuitry 21, via the frequency converter 70)—in case it is not already using FR1 in RRC_CONNECTED mode.

In some but not necessarily all examples, the apparatus 10 is configured to cause transfer of signals for: paging, or measurement for cell or beam (re)selection, or for user equipment to network notification, between the second antenna arrangement 32 and the first radio frequency circuitry 21, via the frequency converter 70 to enable.

The term 'selection' includes initial selection and also reselection.

When the UE is in RRC_IDLE or RRC_INACTIVE, the UE needs to monitor paging and perform RRM measurements for cell selection/reselection periodically and receive system information in system information blocks (SIB). Measurements on any FR2 reference signal which is using lower bandwidth and SIB can be done using UE's FR1 hardware (first radio frequency circuitry 21, via the frequency converter 70).

For example, the UE can transmit in FR2 tracking area update (TAU), and/or Radio Access Network (RAN)-based notification area update (RNAU), to the network, while using the UE's FR1 hardware (first radio frequency circuitry 21, via the frequency converter 70).

When the UE is in RRC_CONNECTED mode the UE's measurements are performed on FR2 reference signals which do not need the full FR2 bandwidth. Where the FR2 reference signal has a bandwidth and SCS where FR1 hardware can be utilized, the UE can route the FR2 signaling via its FR1 hardware (first radio frequency circuitry 21, via the frequency converter 70).

This can be performed for Radio link monitoring (RLM), beam failure detection (BFD) and layer 1 reference signal received power (L1-RSRP) measurements, Radio Resource Management (RRM) Measurements (downlink DL) and measurement reporting (uplink UL).

In some but not necessarily all examples, the apparatus 10 is configured to switch an assessment that a data communications signal can be transferred between the second antenna arrangement 32 and the first radio frequency circuitry 21 to an assessment that the data communications signal cannot be transferred between the second antenna arrangement 32 and the first radio frequency circuitry 21, and configured to switch within or between short time periods, for example two consecutive time slots, in dependence upon the assessment, from transferring the signal between the second antenna arrangement 32 and the first radio frequency circuitry 21, via the frequency converter 70 to transferring the signal between the second antenna arrangement 32 and the second radio frequency circuitry 22.

This applies when the UE is receiving or transmitting data (RRC-DATA) over the air in FR2 and the data has a sufficiently low bandwidth and SCS.

A UE transitions to RRC_CONNECTED when data traffic in DL and/or UL is needed on one or more carriers. The data plane may be used as long as the SCS and bandwidth is supported by the FR1 hardware (first radio frequency circuitry 21) and can be utilized for FR2 alone or even FR1 and FR2.

In some but not necessarily all examples, the apparatus 10 is configured to transfer signals for clear channel assessment between the second antenna arrangement 32 and the first radio frequency circuitry 21, via the frequency converter 70.

In some but not necessarily all examples, the UE performs clear channel assessment (CCA), also known as Listen-before-talk (LBT) which is used for unlicensed band deployments. During listening to a higher frequency channel (LBT) the UE needs to receive (listen) in the several directions of its planned uplink scheduled slot to ensure that the channel is free in the next available signaling slot prior to channel access (transmission). In this preparation (LBT), the UE may use lower frequency hardware (first radio frequency circuitry 21, via the frequency converter 70) instead of higher frequency hardware (second radio frequency circuitry 22) and can thereby save power in the LBT sequence leading up to connected mode/traffic. The prerequisite is that the required bandwidth of the higher frequency unlicensed channel is within the bandwidth constraints of the lower frequency channel(s).

In some but not necessarily all examples, the apparatus 10 is configured to assess whether a signal can be transferred between the second antenna arrangement 32 and the first radio frequency circuitry 21 in dependence upon: a battery level of the apparatus 10; or generated heat at the apparatus 10.

In some but not necessarily all examples, the UE is continuously monitoring its battery level. The UE then enables the hardware switching when it determines its battery level is below a defined threshold. The hardware switching is the switching that causes the signal to be transferred between the second antenna arrangement 32 and the first radio frequency circuitry 21. The battery level is therefore a criterion that can trigger the assessment 100 of whether a signal can be transferred between the second antenna arrangement 32 and the first radio frequency circuitry 21. The second antenna arrangement 32 continues to be used, but there is a switch from using the second radio frequency circuitry 22 in combination with the second antenna arrangement 32 to instead using the first radio frequency circuitry 21 and the frequency converter 70 in combination with the second antenna arrangement 32 when there is a positive assessment 120.

In this or other examples, the UE is continuously monitoring heat generated at the UE. For example, power amplifiers (PAs) generate high heat which may impact UE's performance. The UE then enables the hardware switching when it determines a temperature parameter is above a threshold. The parameter can be the temperature, or a rate of change of temperature, a combination of a temperature and a rate of change of temperature or some other temperature related parameter. The hardware switching is the switching that causes the signal to be transferred between the second antenna arrangement 32 and the first radio frequency circuitry 21. The heat generated is therefore a criterion that triggers the assessment 100 of whether a signal can be transferred between the second antenna arrangement 32 and the first radio frequency circuitry 21. The second antenna arrangement 32 continues to be used, but there is a switch from using the second radio frequency circuitry 22 in combination with the second antenna arrangement 32 to instead using the first radio frequency circuitry 21 and the frequency converter 70 in combination with the second antenna arrangement 32 when there is a positive assessment 120.

Thus, in some but not necessarily all examples, the apparatus 10 is configured to switch from transferring a signal between the second antenna arrangement 32 and the second radio frequency circuitry 22 to transferring a signal between the second antenna arrangement 32 and the first radio frequency circuitry 21 in dependence upon: a battery level of the apparatus 10; or generated heat at the apparatus 10.

The assessment of whether or not a signal can be transferred using the second antenna arrangement 32 and the second radio frequency circuitry 22 or the second antenna arrangement 32 and the first radio frequency circuitry 21 (with the frequency converter 70) can be dependent upon the bandwidth of the signal and/or the SCS of the signal. In some but not necessarily all examples, the apparatus 10 is configured to control at least a parameter of a signal required for a service, for example bandwidth and/or SCS, such that it can be transferred between the second antenna arrangement 32 and the first radio frequency circuitry 21, via the frequency converter 70.

In some examples, the UE may force a planned or scheduled service to fit into the channel capabilities (e.g. bandwidth and/or SCS) of the first radio frequency circuitry 21 even if the service could use the full channel capabilities of the second radio frequency circuitry 22.

In some but not necessarily all examples, the apparatus 10 is configured to cause transfer of multiple signals between the second antenna arrangement 32 and the first radio frequency circuitry 21 to augment channels available via the second radio frequency circuitry 22. The channels can be receiver channels or transmission channels.

This can enable a faster beam scan during initial access since the UE utilizes more receiver chains in the first radio frequency circuitry 21 (FR1) than are available in the second radio frequency circuitry 22 (FR2).

In some but not necessarily all examples, the apparatus 10 is configured to move the second radio frequency circuitry 22 to a low-power consumption mode while transferring the signal between the second antenna arrangement 32 and the first radio frequency circuitry 21, via a frequency converter 70.

The low-power consumption mode can be selected on how quickly the second radio frequency circuitry 22 needs to be used or is likely to need to be in a full-power mode i.e. how quickly the low-power consumption mode needs to be exited.

The low-power consumption mode has lower current consumption compared to the operational state, which allows the chipset to react to operational instructions within microseconds.

Examples of low-power consumption modes include inactive mode and sleep mode. The sleep mode itself can have different levels and exit times. The sleep mode has lower power consumption and longer wake-up times than the inactive mode.

Examples of low-power consumption modes include UE sleep modes such as Deep sleep, Light sleep, and Micro sleep. The Deep and Light sleep are for Discontinuous Reception (DRX) operation while micro sleep is used for the active state.

A low-power consumption mode is less-power consuming than another mode of operation and it typically has a reduced functionality/operability.

While there is a benefit to placing the second radio frequency circuitry 22 into a low-power consumption mode when there is hardware switching it is not essential. The hardware switching is the switching that causes the signal to be transferred between the second antenna arrangement 32 and the first radio frequency circuitry 21.

Figure 4:
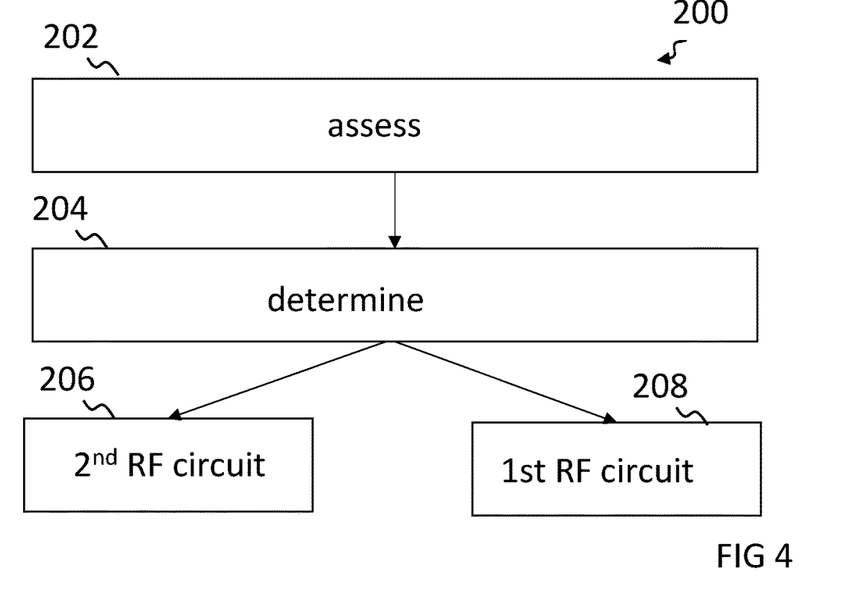
FIG. 4 shows another example of the subject matter described herein.

FIG. 4 illustrates an example of a method 200 for routing a signal between a second radio frequency circuitry 22 and a second antenna arrangement 32 or between a first radio frequency circuitry 21 and the second antenna arrangement 32.

At block 202, the method comprises assessing whether a signal can be transferred between a first radio frequency circuitry 21, configured for operation in one or more first radio frequency bands 41 and a second antenna arrangement 32, configured for operation in one or more second radio frequency bands 42 that are different to the one or more first radio frequency bands 41.

At block 204, the method comprises in dependence upon the assessment determining whether to
 (i) at block 206, transfer the signal between a second radio frequency circuitry 22 configured for operation in one or more second radio frequency bands 42 and the second antenna arrangement 32; or
 (ii) at block 208, transfer the signal between the first radio frequency circuitry 21 and the second antenna arrangement 32, via a frequency converter 70 configured to enable, for the signal, frequency conversion between the one or more second radio frequency bands 42 and the one or more first radio frequency bands 41.

The method can be used for reception and/or transmission.

Figure 5:
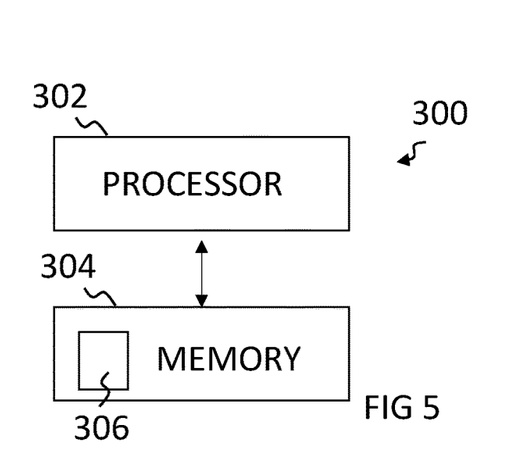
FIG. 5 shows another example of the subject matter described herein.

FIG. 5 illustrates an example of a controller 300 that can be used in the apparatus 10. Implementation of a controller 300 may be as controller circuitry. The controller 300 may be implemented in hardware alone, have certain aspects in software including firmware alone or can be a combination of hardware and software (including firmware).

As illustrated in FIG. 5 the controller 300 may be implemented using instructions that enable hardware functionality, for example, by using executable instructions of a computer program 306 in a general-purpose or special-purpose processor 302 that may be stored on a computer readable storage medium (disk, memory etc.) 304 to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 10 when loaded into the processor 302. The computer program instructions, of the computer program 306, provide the logic and routines that enables the apparatus to perform the methods illustrated in the drawings. The processor 302 by reading the memory 304 is able to load and execute the computer program 306.

The apparatus 10 therefore comprises:
 at least one processor 302; and
 at least one memory 304 including computer program code
 the at least one memory 304 and the computer program code configured to, with the at least one processor 302, cause the apparatus 10 at least to perform:
 assessing whether a signal can be transferred between a first radio frequency circuitry 21, configured for operation in one or more first radio frequency bands 41 and a second antenna arrangement 32, configured for operation in one or more second radio frequency bands 42 that are different to the one or more first radio frequency bands 41; and
 in dependence upon the assessment determining whether to
 (i) transfer the signal between a second radio frequency circuitry 22 configured for operation in one or more second radio frequency bands 42 and the second antenna arrangement 32; or
 (ii) transfer the signal between the first radio frequency circuitry 21 and the second antenna arrangement 32, via a frequency converter 70 configured to enable, for the signal, frequency conversion between the one or more second radio frequency bands 42 and the one or more first radio frequency bands 41.

Figure 6:
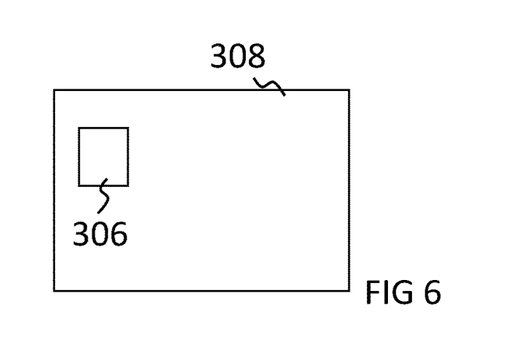
FIG. 6 shows another example of the subject matter described herein.

As illustrated in FIG. 6, the computer program 306 may arrive at the apparatus 10 via any suitable delivery mechanism 308. The delivery mechanism 308 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 306. The delivery mechanism may be a signal configured to reliably transfer the computer program 306. The apparatus 10 may propagate or transmit the computer program 306 as a computer data signal.

Computer program instructions for causing an apparatus to perform at least the following or for performing at least the following:
- assessing whether a signal can be transferred between a first radio frequency circuitry 21, configured for operation in one or more first radio frequency bands 41 and a second antenna arrangement 32, configured for operation in one or more second radio frequency bands 42 that are different to the one or more first radio frequency bands 41; and
- in dependence upon the assessment determining whether to
  - (i) transfer the signal between a second radio frequency circuitry 22 configured for operation in one or more second radio frequency bands 42 and the second antenna arrangement 32; or
  - (ii) transfer the signal between the first radio frequency circuitry 21 and the second antenna arrangement 32, via a frequency converter 70 configured to enable, for the signal, frequency conversion between the one or more second radio frequency bands 42 and the one or more first radio frequency bands 41.

The computer program instructions may be comprised in a computer program, a non-transitory computer readable medium, a computer program product, a machine readable medium. In some but not necessarily all examples, the computer program instructions may be distributed over more than one computer program.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
- (a) hardware-only circuitry implementations (such as implementations in only analog and/or digital circuitry) and
- (b) combinations of hardware circuits and software, such as (as applicable):
  - (i) a combination of analog and/or digital hardware circuit(s) with software/firmware and
  - (ii) any portions of hardware processor(s) with software (including digital signal processor(s)), software, and memory(ies) that work together to cause an apparatus, such as a mobile phone or server, to perform various functions and
- (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the drawings may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above-described examples find application as enabling components of:
- automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term "one or more first radio frequency bands" means N frequency bands where $N \geq 1$.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   first radio frequency circuitry configured for operation at least in one or more first radio frequency bands;
   second radio frequency circuitry configured for operation at least in one or more second radio frequency bands;
   a first antenna arrangement configured for operation in the one or more first radio frequency bands;
   a second antenna arrangement configured for operation in the one or more second radio frequency bands;
   a first radio frequency coupling for transferring of a signal between the first antenna arrangement and the first radio frequency circuitry;
   a second radio frequency coupling for transferring of a signal between the second antenna arrangement and the first second frequency circuitry; and
   a controller for assessing whether a signal can be transferred between the second antenna arrangement and the first radio frequency circuitry and, in dependence upon the assessment, for transferring the signal between the second antenna arrangement and the first radio frequency circuitry, via a frequency converter configured to enable, for the signal, frequency conversion between the one or more second radio frequency bands and the one or more first radio frequency bands.

2. The apparatus as claimed in claim 1, configured to assess whether the signal can be transferred between the second antenna arrangement and the first radio frequency circuitry in dependence upon a bandwidth of the signal and/or a sub carrier spacing of the signal.

3. The apparatus as claimed in claim 1, configured to assess that the signal can be transferred between the second antenna arrangement and the first radio frequency circuitry only when a required bandwidth of the signal does not exceed 100 MHz and a required sub carrier spacing of the signal does not exceed 60 kHz.

4. The apparatus as claimed in claim 1, configured to assess whether the signal can be transferred between the second antenna arrangement and the first radio frequency circuitry in dependence upon an availability of the first radio frequency circuitry for the signal.

5. The apparatus as claimed in claim 1, configured as user equipment.

6. The apparatus as claimed in claim 5, configured to transfer control channel signals between the second antenna arrangement and the first radio frequency circuitry, via the frequency converter.

7. The apparatus as claimed in claim 5, configured to transfer signals for an initial access procedure between the second antenna arrangement and the first radio frequency circuitry, via the frequency converter or configured to transfer signals during a Radio Resource Control Idle state between the second antenna arrangement and the first radio frequency circuitry, via the frequency converter.

8. The apparatus as claimed in claim 5, configured to cause transfer of signals for: paging, or measurement for cell or beam selection, or for user equipment to network notification, between the second antenna arrangement and the first radio frequency circuitry, via the frequency converter.

9. The apparatus as claimed in claim 5, configured to switch an assessment that a data communications signal can be transferred between the second antenna arrangement and the first radio frequency circuitry to an assessment that the data communications signal cannot be transferred between the second antenna arrangement and the first radio frequency circuitry, and configured to switch within or between time periods, in dependence upon the assessment, from transferring the signal between the second antenna arrangement and the first radio frequency circuitry, via the frequency converter to transferring the signal between the second antenna arrangement and the second radio frequency circuitry.

10. The apparatus as claimed in claim 5, configured to transfer signals for clear channel assessment between the second antenna arrangement and the first radio frequency circuitry, via the frequency converter.

11. The apparatus as claimed in claim 5, configured to assess whether a signal can be transferred between the second antenna arrangement and the first radio frequency circuitry in dependence upon: a battery level of the apparatus; or generated heat at the apparatus.

12. The apparatus as claimed in claim 1, configured to control at least a bandwidth of a signal required for a service such that the signal can be transferred between the second antenna arrangement and the first radio frequency circuitry, via the frequency converter.

13. The apparatus as claimed in claim 1 configured to cause transfer of multiple signals between the second antenna arrangement and the first radio frequency circuitry to augment receiver channels available via the second radio frequency circuitry.

14. The apparatus as claimed in claim 1, configured to move the second radio frequency circuitry to a low-power consumption mode while transferring the signal between the second antenna arrangement and the first radio frequency circuitry, via a frequency converter.

15. A method comprising:
assessing whether a signal can be transferred between a first radio frequency circuitry, configured for operation in one or more first radio frequency bands and a second antenna arrangement, configured for operation in one or more second radio frequency bands that are different to the one or more first radio frequency bands; and,
in dependence upon the assessment:
(i) transferring the signal between a second radio frequency circuitry configured for operation in one or more second radio frequency bands and the second antenna arrangement; or
(iii) transferring the signal between the first radio frequency circuitry and the second antenna arrangement, via a frequency converter configured to enable, for the signal, frequency conversion between the one or more second radio frequency bands and the one or more first radio frequency bands.

16. The method as claimed in claim 15, further comprising assessing whether the signal can be transferred between the second antenna arrangement and the first radio frequency circuitry in dependence upon a bandwidth of the signal and/or a sub carrier spacing of the signal.

17. The method as claimed in claim 15, further comprising assessing that the signal can be transferred between the second antenna arrangement and the first radio frequency circuitry only when a required bandwidth of the signal does not exceed 100 MHz and a required sub carrier spacing of the signal does not exceed 60 kHz.

18. The method as claimed in claim 15, further comprising assessing whether the signal can be transferred between the second antenna arrangement and the first radio frequency circuitry in dependence upon an availability of the first radio frequency circuitry for the signal.

19. The method as claimed in claim 15, further comprising transferring control channel signals between the second antenna arrangement and the first radio frequency circuitry, via the frequency converter.

20. The method as claimed in claim 15, further comprising transferring signals for an initial access procedure between the second antenna arrangement and the first radio frequency circuitry, via the frequency converter or transferring signals during a Radio Resource Control Idle state between the second antenna arrangement and the first radio frequency circuitry, via the frequency converter.

* * * * *